(12) United States Patent
Nakai

(10) Patent No.: US 7,007,536 B2
(45) Date of Patent: Mar. 7, 2006

(54) SYNCHRONIZER SLEEVE USED IN POWER TRANSMISSION AND PRESS-FORMING APPARATUS FOR THE SAME

(75) Inventor: Hitoshi Nakai, Nishio (JP)

(73) Assignee: Aisin Ai Co., Ltd., Nishio (JP)

( * ) Notice: Subject to any disclaimer, the term of this patent is extended or adjusted under 35 U.S.C. 154(b) by 0 days.

(21) Appl. No.: 10/640,663

(22) Filed: Aug. 14, 2003

(65) Prior Publication Data
US 2004/0104092 A1 Jun. 3, 2004

(30) Foreign Application Priority Data
Aug. 14, 2002 (JP) ............................ 2002-236588

(51) Int. Cl.
*B21K 1/30* (2006.01)
(52) U.S. Cl. .................. 72/355.6; 29/893.34
(58) Field of Classification Search ............... 72/352, 72/354.6, 355.2, 355.4, 355.6, 360; 29/893.34
See application file for complete search history.

(56) References Cited
FOREIGN PATENT DOCUMENTS

| DE | 44 18 632 A1 | 12/1994 |
|---|---|---|
| DE | 196 46 850 C1 | 11/1997 |
| DE | 198 09 039 A1 | 9/1999 |
| EP | 0 453 167 A1 | 10/1991 |
| JP | 48-67649 | 9/1973 |
| JP | 49-83448 | 7/1974 |
| JP | 50-122732 | 10/1975 |
| JP | 4-125318 A | 4/1992 |
| JP | 10-216887 A | 8/1998 |

*Primary Examiner*—Lowell A. Larson
(74) *Attorney, Agent, or Firm*—Buchanan Ingersoll PC

(57) ABSTRACT

A synchronizer sleeve adapted for use in a gear synchronizer mechanism of a power transmission, the synchronizer sleeve being formed at its inner periphery with inner spline teeth for meshing engagement to be meshed with a clutch gear of a change-speed gear train and inner spline teeth for synchronization positioned among the inner spline teeth for meshing engagement in a circumferential direction to be meshed with a synchronizer ring, wherein the inner spline teeth for meshing engagement and for synchronization are provided respectively at their one ends with a pair of chamfer surfaces formed by plastic deformation in a press-process, and wherein the inner spline teeth for synchronization are formed shorter in axial length than the inner spline teeth for meshing engagement. In the synchronizer sleeve, a ridge of each pair of the chamfer surfaces and an intersection of each of the chamfer surfaces and each tooth flank of the inner spline teeth are rounded off by plastic deformation in the press-process.

4 Claims, 11 Drawing Sheets

SYNCHRONIZER SLEEVE USED IN POWER TRANSMISSION AND PRESS-FORMING APPARATUS FOR THE SAME

BACKGROUND OF THE INVENTION

1. Field of the Invention

The present invention relates to a synchronizer sleeve adapted for use in a gear synchronizer mechanism of a power transmission for an automotive vehicle and a press-forming apparatus for the synchronizer sleeve, and more particularly to a press-forming apparatus for forming a chamfer on each distal end of inner spline teeth of the synchronizer sleeve by plastic deformation.

2. Discussion of the Prior Art

Disclosed in Japanese Patent Laid-open Publication No. 48-67649 is a synchronizer sleeve S adapted for use in a gear synchronizer mechanism of a power transmission as shown in FIGS. 1(A) and 1(B). The synchronizer sleeve S is formed at its inner periphery with circumferentially spaced inner spline teeth 1 to be meshed with a clutch gear of a change-speed gear train and inner spline teeth 2 for synchronization shorter in axial direction than the inner spline teeth 1 for meshing engagement and positioned among them in a circumferential direction to be meshed with a synchronizer ring.

In a conventional manufacturing process of the synchronizer sleeve, the inner spline teeth 1 for meshing engagement and the inner spline teeth 2 for synchronous engagement are formed by machining with a broach-cutter as shown in FIG. 2(A), and subsequently a chamfer 1a or 1b for meshing engagement is formed by an end-mill cutter on each distal end surface 3 of the inner spline teeth 1 indexed one by one tooth as shown in FIG. 2(B). Thereafter, the machining condition is changed as shown in FIG. 2(C), wherein a chamfer surface 2a or 2b for synchronous engagement is formed by a cutting tool such as an end-mill cutter on each distal end surface of the inner spline teeth 2 for synchronous engagement indexed as shown in the figure. After finish of the chamfer machining at one surface, the work piece of the synchronizer sleeve is reversed in position, and the chamfer machining is carried out by the cutting tool 4 such as the end-mill cutter in the same manner as described above as shown in FIGS. 2(D) and 2(E).

In such a machining process as described above, there will occur the following problems.

1) In the cutting process, the cutting time of the chamfers for meshing engagement and synchronous engagement inevitably becomes long, resulting in an increase of the manufacturing cost of the synchronizer sleeve S.

2) In operation of the power transmission, the synchronizer sleeve is moved by shifting operation of a driver toward a synchronizer ring N and a clutch gear P (a piece gear) from a neutral position as shown in FIG. 3(A). In such operation, an intersection 2d of the chamfer surface 2b and a spline tooth flank of the synchronizer sleeve S is moved in slide engagement with the chamfer surface 6 of synchronizer ring N so that the rotation speed is synchronized by frictional engagement of the synchronizer ring N with the clutch gear P. To avoid seizure of the synchronizer mechanism during the synchronous operation, a copper material lower in hardness than the material of the synchronizer sleeve S is used as the raw material of the synchronizer ring N. For this reason, if the intersection 2D of the chamfer surface 2b of synchronization and the spline tooth flank 2f of synchronizer sleeve S was not rounded off, the chamfer surface 6 of synchronizer ring N would be scraped at each shifting operation. This shorten the life span of synchronizer ring N and deteriorates the shift feeling in a short time.

In addition, when the synchronizer sleeve S is brought into meshing engagement with the clutch gear P as shown in FIG. 2(D) after passed through the synchronizer ring N as shown in FIG. 3(C) in the shifting operation, the chamfer ridge 1c of synchronizer sleeve S tends to abut against the chamfer ridge 7 of clutch gear P. In such an instance, if the chamfer ridge 1c was not rounded off, the chamfer ridge 1c would be damaged since the harness of the raw material of the synchronizer sleeve is the same as that of the clutch gear P, resulting in deterioration of the shift feeling. Accordingly, it required in the synchronizer sleeve S to round off the intersection 2e of the chamfer surface 2a for synchronization and the spline tooth flank 2f, the intersection 2d of the chamfer surface 2b for synchronization and the spline tooth flank 2f and the ridge 1c of the chamfer surfaces 1 for meshing engagement. It is, however, impossible to round off the intersections 2e, 2d and the chamfer ridge 1c by cutting as shown in FIGS. 2(A)–2IE). For this reason, the intersections 2e, 2d and the chamfer ridge 1c must be rounded off respectively at different steps, resulting in an increase of the manufacturing cost of the synchronizer sleeve.

3) In the synchronizer sleeve S whose inner spline teeth 2 for synchronization to be meshed with the synchronizer ring are formed shorter in axial length than the inner spline teeth 1 to be meshed with the change-speed gear and positioned among the inner spline teeth 1 as shown in FIGS. 1(A) and 1(B), each chamfer of the inner spline teeth 2 for synchronization is formed in a position displaced axially inwardly from the chamfers of inner spline teeth 1 for meshing engagement. In the case that the chamfers of inner spline teeth 2 are formed by cut-machining described above, the cutting work is restricted due to relative position of the chamfers of inner spline teeth 2 for synchronization to the chamfers of inner spline teeth 1 for meshing engagement. Accordingly, in a condition where the chamfer portion of inner spline teeth 2 for synchronization is spaced in a large distance from the chamfer portion of inner spline teeth 1 for meshing engagement, as shown in FIG. 4(A), the chamfers of inner spline teeth 2 for synchronization may not be formed by the cutting tool 4 such as the end-mill cutter since the cutting tool is interfered with the chamfers of inner spline teeth 1 for meshing engagement at a portion 8 in contact therewith. In such a case, it is obliged to reduce the space L between the chamfer portion of inner spline teeth 1 and the chamfer portion of inner spline teeth 2. This means that the synchronizer sleeve has to be designed at the sacrifice of shift feeling. To avoid such problems, proposed in Japanese Utility Model Laid-open Publication Nos. 49-83448 and 50-122732 is a synchronizer sleeve whose chamfers are formed asymmetrical in a circumferential direction. In the cutting process of the synchronizer sleeve, however, the end-mill cutter 4 is interfered with a chamfer 9 of an adjacent spline tooth, resulting in restriction of the offset amount of the chamfer ridge and the shape of the chamfer surface. This means also that the synchronizer sleeve has to be designed at the sacrifice of shift feeling.

SUMMARY OF THE INVENTION

To avoid the problems in the cutting process discussed above, a primary object of the present invention is to provide a synchronizer sleeve whose inner spline teeth for meshing engagement and inner spline teeth for synchronization can be formed respectively at their distal ends with a pair of chamfer surfaces and rounded off at a ridge of each pair of the chamfer surfaces and an intersection of each chamfer surface and each tooth flank of the inner spline teeth.

A secondary object of the present invention is to provide a press-forming apparatus capable of forming a pair of chamfer surfaces on each distal end of inner spline teeth for meshing engagement and inner spline teeth for sychornization and rounding off a ridge of each pair of the chamfer surfaces and an intersection of each chamfer surface and each tooth flank of the inner spline teeth and of forming the inner spline teeth for synchronization shorter in axial length than the inner spline teeth for meshing engagement.

According to the present invention, the primary object is accomplished by providing a synchronizer sleeve adapted for use in a gear synchronizer mechanism of a power transmission, the synchronizer sleeve being formed at its inner periphery with inner spline teeth for meshing engagement to be meshed with a clutch gear of a change-speed gear train and inner spline teeth for synchronization positioned among the inner spline teeth for meshing engagement in a circumferential direction to be meshed with a synchronizer ring, wherein the inner spline teeth for meshing engagement and for synchronization are provided respectively at their one ends with a pair of chamfer surfaces formed by plastic deformation in a press-process, and wherein the inner spline teeth for synchronization are formed shorter in axial length than the inner spline teeth for meshing engagement. In the synchronizer sleeve, a ridge of each pair of the chamfer surfaces and an intersection of each of the chamfer surfaces and each tooth flank of the inner spline teeth can be rounded off by plastic deformation in the press-process. This is useful to enhance the durability of the synchronizer ring and to eliminate damage of the ridge of the chamfer surfaces formed on each distal end of the inner spline teeth.

According to the present invention, the secondary object is accomplished by providing a press-forming apparatus for a synchronizer sleeve formed at its inner periphery with inner spline teeth for meshing engagement to be meshed with a clutch gear of a change-speed gear train and inner spline teeth for synchronization positioned among the inner spline teeth for meshing engagement in a circumferential direction to be meshed with a synchronizer ring, which press-forming apparatus comprises a pair of upper and lower dies respectively provided with a first chamfer forming portion to be coupled with the inner spline teeth of the synchronizer sleeve for meshing engagement and a second chamfer forming portion smaller in depth than the first chamfer forming portion to be coupled with the inner spline teeth of the synchronizer sleeve for synchronization, said first and second chamfer forming portions being provided respectively with outer spline teeth which are formed to correspond with the inner spline teeth of the synchronizer sleeve for meshing engagement and for synchronization and formed at their proximal ends with a pair of chamfer forming surfaces in a condition where a ridge of the chamfer forming surfaces and an intersection of each of the chamfer forming surfaces and each tooth flank of the outer spline teeth are rounded off, wherein the synchronizer sleeve is pressed in a condition where the inner spline teeth of the synchronizer sleeve for meshing engagement and for synchronization have been vertically coupled at their one ends with the chamfer forming portions of the lower die and at their other ends with the chamfer forming portions of the upper die thereby to form a pair of chamfer surfaces respectively on opposite ends of the inner spline teeth of the synchronizer sleeve for the meshing engagement and for synchronization and to form the inner spline teeth for synchronization shorter in axial length than, the inner spline teeth for meshing engagement.

In the press-forming apparatus, the pair of chamfer surfaces can be formed by plastic deformation on each distal end of the inner spline teeth of the synchronizer sleeve for meshing engagement and for synchronization without any restriction in position and shape of the chamfer surfaces, and simultaneously the ridge of each of the chamfer surfaces and the intersection of each of the chamfer surfaces and each tooth flank of the inner spline teeth can be accurately rounded off.

BRIEF DESCRIPTION OF THE DRAWINGS

Other objects, features and advantages of the present invention will be more readily appreciated from the following detailed description of a preferred embodiment thereof when taken together with the accompanying drawings, in which.

DESCRIPTION OF THE PREFERRED EMBODIMENT

Figure 5:
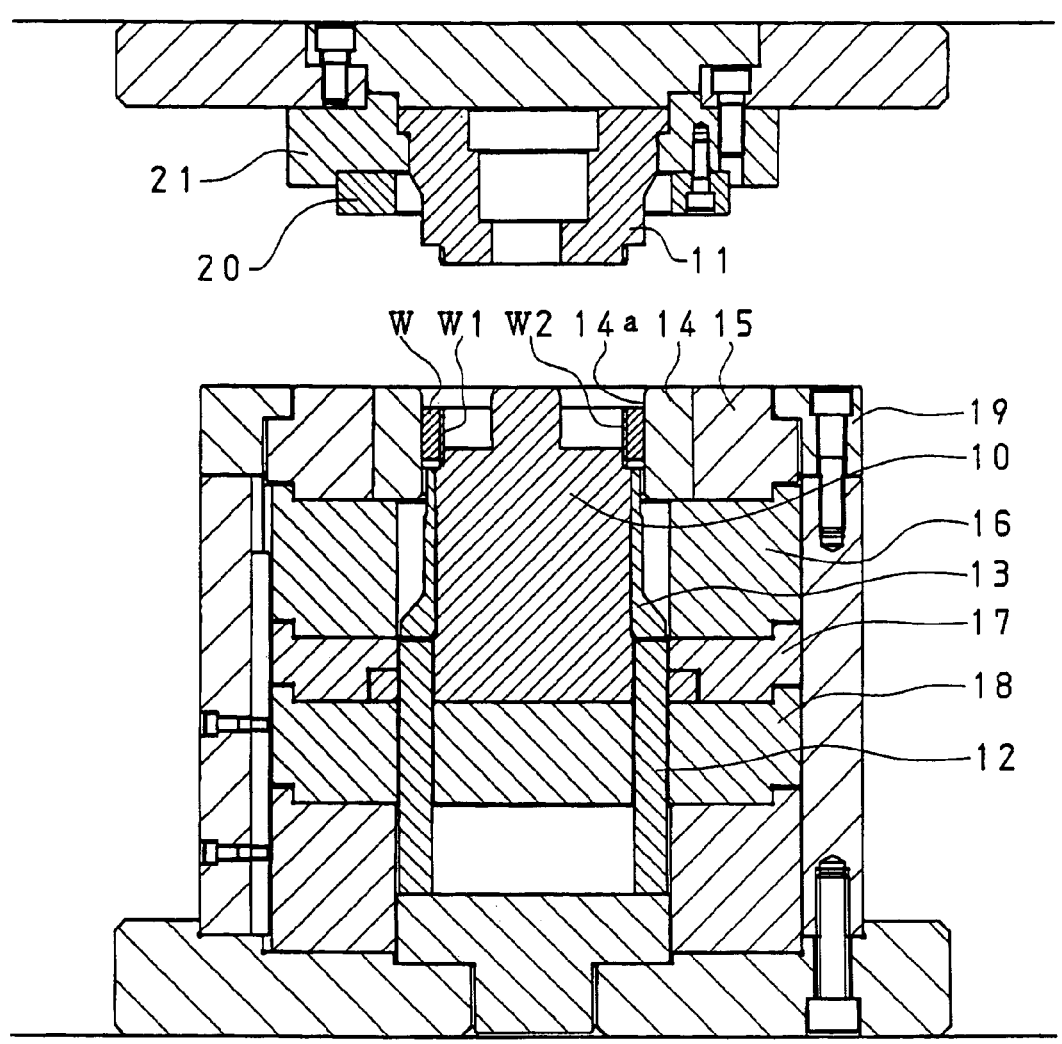
FIG. 5 is a vertical sectional view of a press-forming apparatus for a synchronizer sleeve in accordance with the present invention.

Hereinafter, a preferred embodiment of the present invention will be described with reference to the accompanying drawings. Illustrated in FIG. 5 is a press-forming apparatus of a synchronizer sleeve in accordance with the present invention. As shown in FIG. 5, a work piece W pressed by the press-forming apparatus is in the form of a sleeve preliminarily formed with inner splines W1 and W2 in a cutting process or a plastic machining process. The inner spline teeth W1 and W2 are formed respectively as inner spline teeth for meshing engagement with a clutch gear P of a change-speed gear train and for synchronization.

Figure 6A:
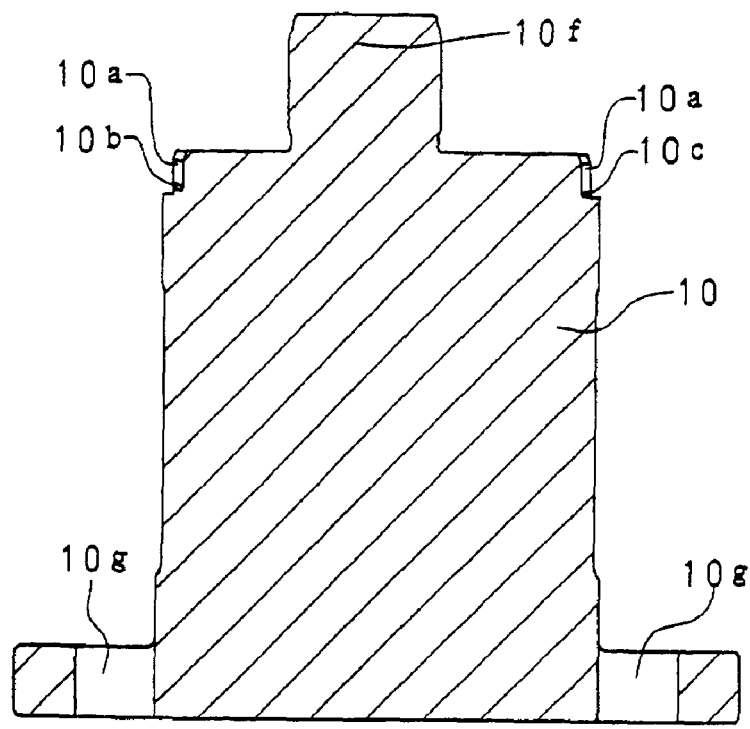
FIG. 6(A) is an enlarged vertical sectional view of a lower die shown in FIG. 5.
Figure 6B:
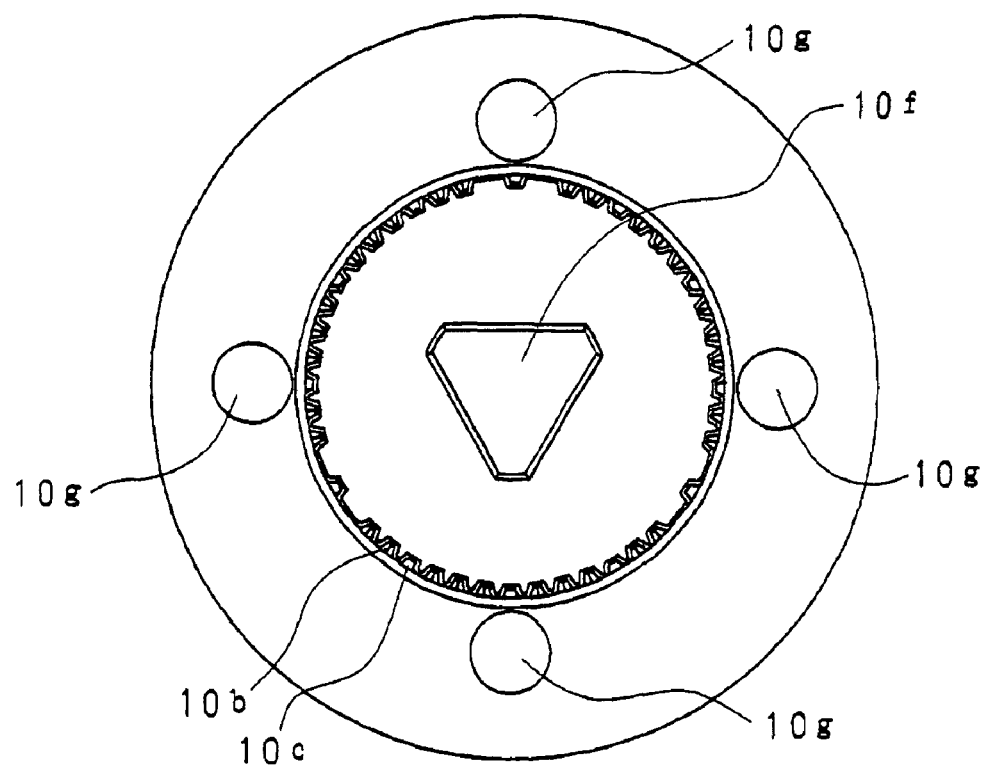
FIG. 6(B) is an enlarged plan view of the lower die shown in FIG. 5.
Figure 7A:
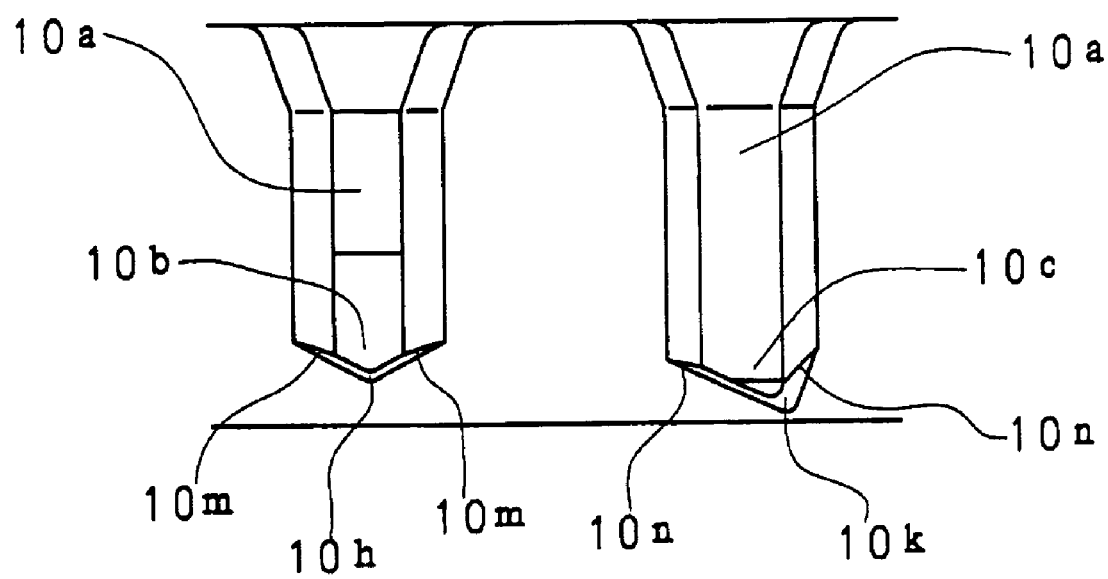
FIG. 7(A) is a partly enlarged view of a chamfer forming portion for meshing engagement and a chamfer forming portion for synchronization formed on the lower die shown in FIG. 6(A)
Figure 7B:
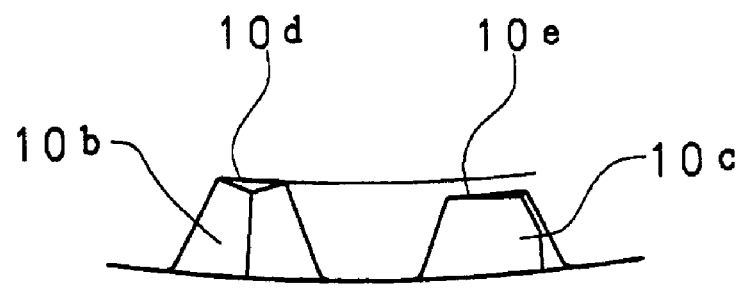
FIG. 7(B) is an enlarged view showing a small diameter portion of spline teeth in the chamfer forming portion shown in FIG. 7(A)

The press-forming apparatus shown in FIG. 5 includes a lower die 10 formed at its upper portion with outer spline teeth 10a to be coupled with the inner spline teeth W1 and W2 of the work piece W as shown in FIGS. 6(A) and 6(B). The outer spline teeth 10a of lower die 10 are formed at their lower ends with a chamfer forming portion 10b for forming a pair of chamfer surfaces on each distal end of the inner spline teeth W2 for synchronization and a chamfer forming portion 10c for forming a pair of chamfer surfaces on each distal end of the inner spline teeth W1 for meshing engagement. In the chamfer forming portion 10b, as shown by an enlarged scale in FIGS. 7(A), 7(B), a ridge 10h of the pair of chamfer surfaces and an intersection 10m of each chamfer surface and each tooth flank of the outer spline teeth 10a are rounded off. Similarly, in the chamfer forming portion 10c, a ridge 10k of the pair of chamfer surfaces and an intersection 10n of each chamfer surface and each tooth flank of the outer spline teeth 10a. The chamfer forming portion 10b for the inner spline teeth W2 for synchronization is located above the chamfer forming portion 10c for the inner spline teeth W1 for meshing engagement to plastically deform the inner spline teeth W2 of work piece W shorter in axial length than the inner spline teeth W1 as described later. With such arrangement, the raw material of inner spline teeth W1 for synchronization is deformed by the chamfer forming portion 10b larger than that under pressure of the chamfer forming portion 10c when the inner spline teeth W1 and W2 of work piece W are formed with the chamfers. That is to say, the pressure caused by the chamfer forming portion 10b in a chamfer forming process becomes higher than that under the chamfer forming portion 10c. As a result, there is a possibility of damage of the lower die 10 caused by unbalance of the pressure. To avoid such damage of the lower die 10, a small diameter portion 10d of the chamfer forming portion 10b is formed smaller than a small diameter portion 10e of the chamfer forming portion 10c to uniform the balance of pressure in the press-forming process. Although the chamfer ridge 10k for meshing engagement is offset from the center of each outer spline tooth 10a as shown in FIG. 7(A), the chamfer ridge 10k may be formed at the center of each outer spline tooth 10a as in the chamfer ridge 10h for synchronization. In addition, the lower die 10 is formed thereon with a guide projection 11f of triangle in cross-section to be coupled with an upper die 11. With this guide projection 11f, the upper and lower outer spline portions are accurately positioned in phase when the upper die 11 is coupled with the lower die 10. The lower die 10 is formed at its bottom with an annular flange formed with circumferentially equally spaced holes 10g through which knockout pins 12 are inserted.

As shown in FIG. 5, the lower die 10 is mounted on a base of a press-machine together with an inner dice 14, an outer dice 15, a dice-holder 16, a plate 17, a packing plate 18 and a ring 19. The inner dice 14 is integrally assembled with the outer dice 15 by press-fit therein. The inner dice 14 is machined slightly larger in its inner diameter 14a than the outer diameter of the work piece to prevent deformation of the work piece W more than a predetermined value when the chamfers are formed on the inner spline teeth. A knockout sleeve 13 is assembled between the inner dice 14 and the dice-holder 16 to be moved by the knockout pins 12 in a vertical direction.

Figure 8A:
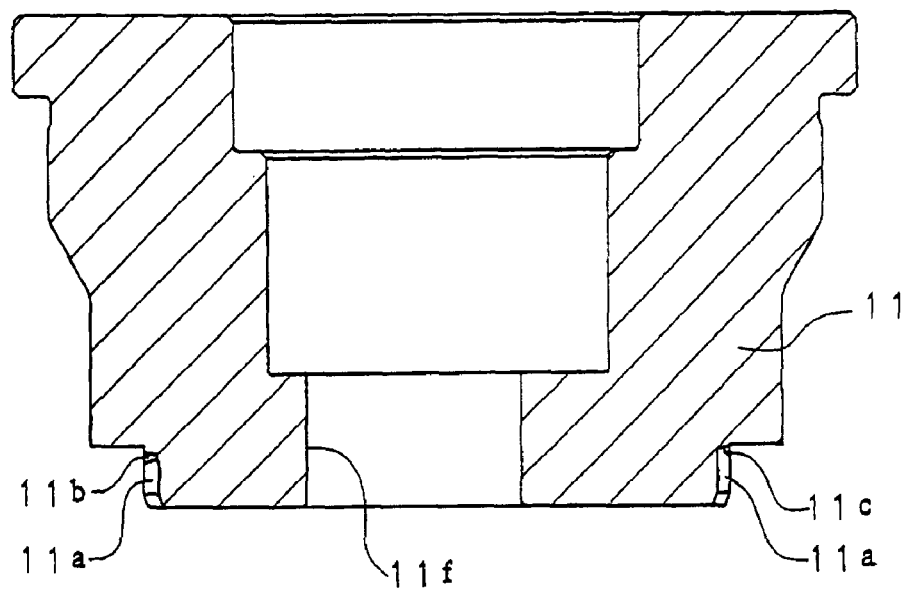
FIG. 8(A) is an enlarged vertical sectional view of an upper die shown in FIG. 5.
Figure 8B:
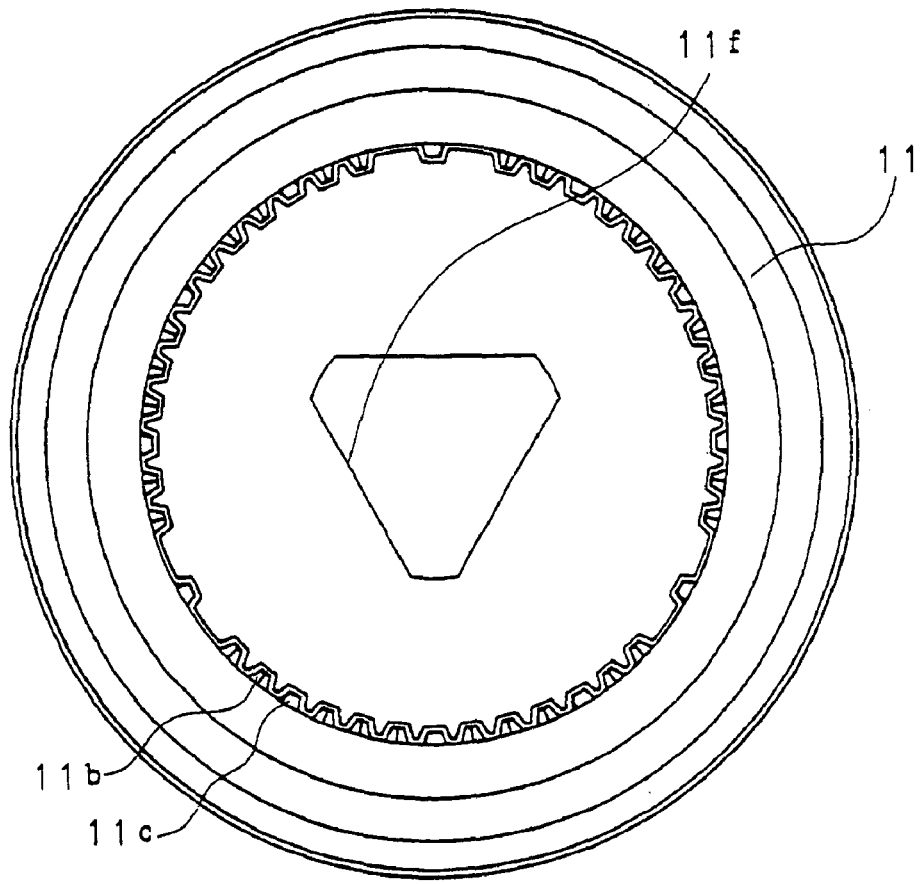
FIG. 8(B) is an enlarge plan view of the upper die shown in FIG. 5.
Figure 9A:
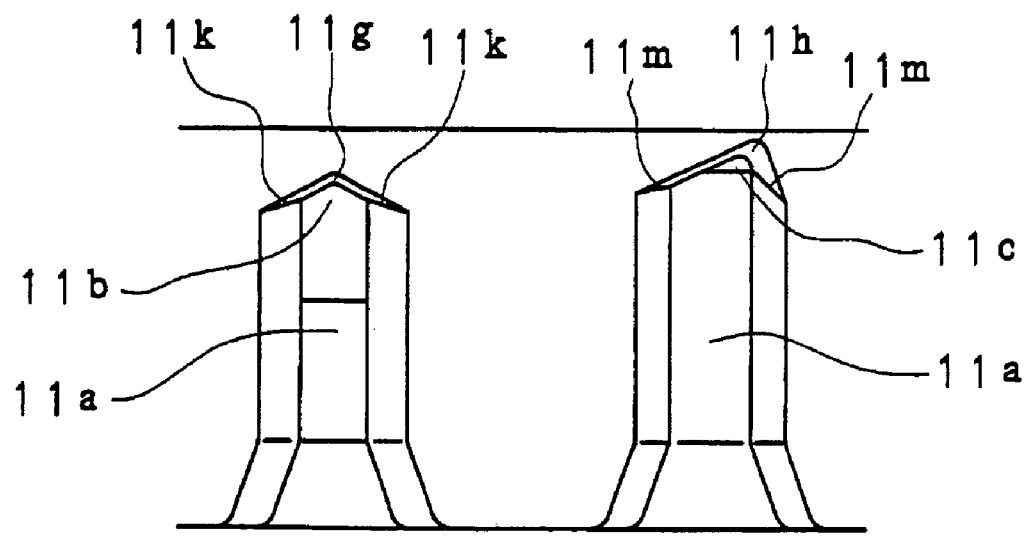
FIG. 9(A) is a partly enlarged view of a chamfer forming portion for meshing engagement and a chamfer forming portion for synchronization formed on the upper die shown in FIG. 8(A)
Figure 9B:
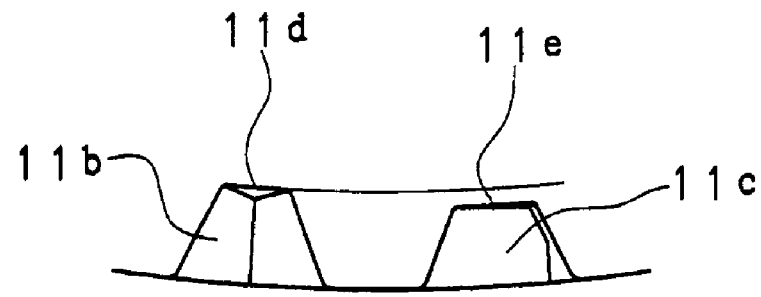
FIG. 9(B) is an enlarge view showing a small diameter portion of spline teeth in the chamfer forming portion shown I FIG. 9(A)

As shown in FIG. 5 and FIGS. 8(A), 8(B), the upper die 11 is formed with outer splines 11a to be coupled with the inner spline teeth W1 and W2 of work piece W. The outer spline teeth 11a of upper die 11 are formed at their upper ends with a chamfer forming portion 11b for forming a pair of chamfer surfaces on the other distal ends of inner spline teeth W2 of work piece W and a chamfer forming portion 11c for forming a pair of chamfer surfaces on the other distal ends of inner spline teeth W1 of work piece W. In the chamfer forming portion 11b, as shown in FIGS. 9(A), 9(B), a ridge 11g of the pair of chamfer surfaces and an intersection 11k of each chamfer surface and each tooth flank of the outer spline teeth 11a are rounded off. Similarly, in the chamfer forming portion 11c, a ridge 11h of the pair of chamfer surfaces and an intersection 11m of each chamfer surface and each tooth flank of the outer spline teeth 11a are rounded off. The chamfer forming portion 11b is located lower than the chamfer forming portion 11c. With such arrangement of the chamfer forming portions 11b and 11c, there is a possibility of damage of the outer spline teeth 11a of upper die 11 caused by unbalance of the pressure as in the lower die 10. To avoid such damage of the upper die 10, a small diameter portion 11d of the chamfer forming portion 11b is formed smaller than a small diameter portion 11e of the chamfer forming portion 11c to uniform the balance of pressure in the press-forming process. Although the chamfer ridge 11h for meshing engagement is offset from the center of each outer spline tooth 11a as shown in FIGS. 9(A), the chamfer ridge 11h may be formed at the center of each outer spline tooth 11a as in the chamfer ridge 11g for synchronization. In addition, the upper die 11 is formed with an engagement bore 11f to be coupled with the guide projection 10f of lower die 10.for positioning the upper and lower outer spline teeth accurately in phase when the upper die 11 is coupled with the lower die 10. As shown in FIG. 5, the upper die 11 is mounted on a ram of the press-machine together with a stopper 20 and an upper die holder 21.

Figure 10:
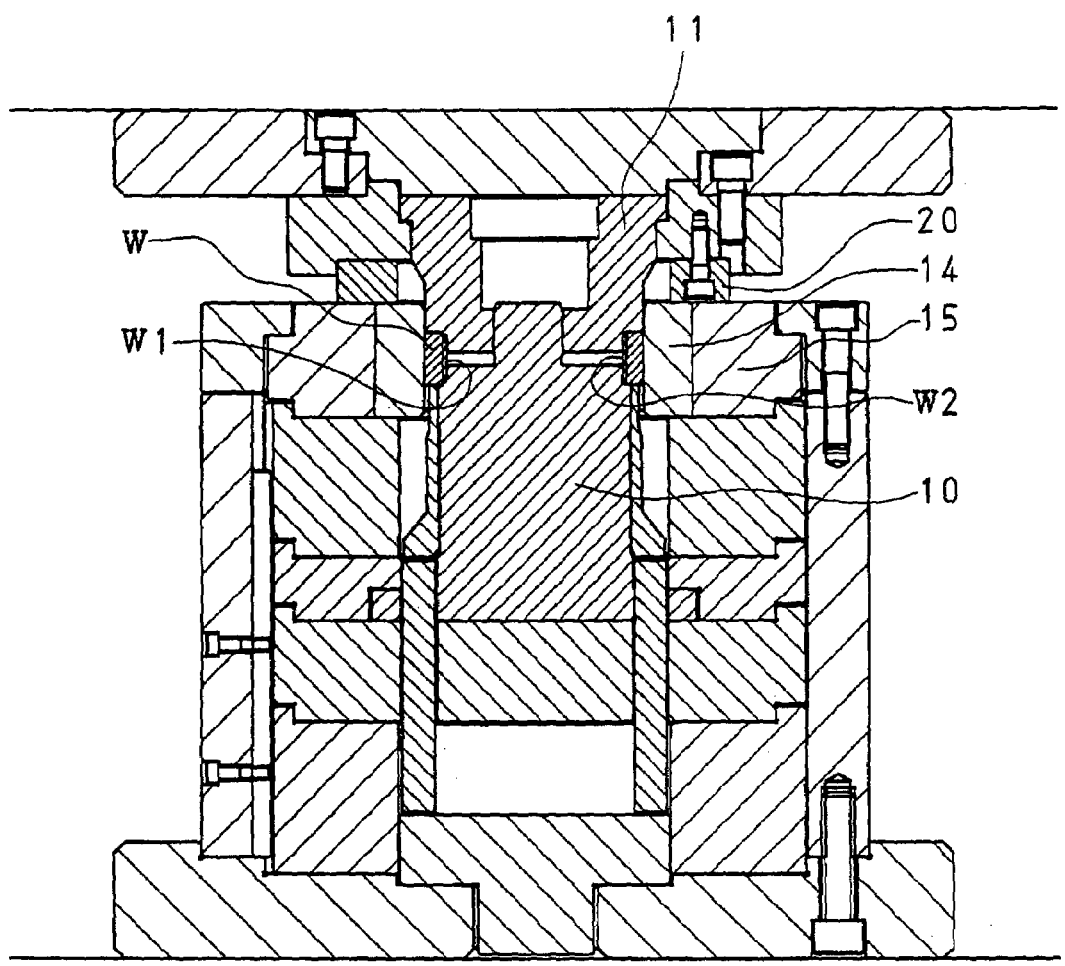
FIG. 10 is a vertical sectional view illustrating an operated condition of the press-forming apparatus shown in FIG. 5.

In the press-forming apparatus as described above, the work piece W is mounted on the lower die 10 in such a manner that the inner spline teeth W1 and W2 of work piece W are vertically coupled with the outer spline teeth 10a of lower die 10. Thereafter, the ram of the press-machine is moved down so that the engagement bore 11f of upper die 11 is coupled with the guide projection 10f of lower die 10. Thus, the outer spline teeth 10a of lower die 10 and the outer spline teeth 11a of upper die 11 are accurately positioned in phase, and the outer spline teeth 11a of upper die 11 are coupled with an upper portion of the inner spline teeth W1 and W2 of work piece W. In such a condition, the ram of the press-machine is further moved down to press the upper die 11 against the lower die 10. Under such pressure of the upper die 11, as shown in FIG. 10, the lower ends of the inner spline teeth W1 and W2 of work piece W are plastically deformed by the chamfer forming portions 10b and 10c of lower die 10, while the upper ends of the inner spline teeth W1 and W2 of work piece W are plastically deformed by the chamfer forming portions 11b and 11c of upper die 11. In this pressure process, the inner spline teeth W1 and W2 of work piece W are formed respectively at their lower ends with a pair of chamfer surfaces for synchronization and a pair of chamfer surfaces for meshing engagement, and a ridge of each pair of the chamfer surfaces and an intersection of each chamfer surface and each tooth flank of the inner spline teeth are rounded off by plastic deformation. On the other hand, the inner spline teeth W1 and W2 of work piece W are formed respectively at their upper ends with a pair of chamfer surfaces for synchronization and a pair of chamfer surfaces for meshing engagement, and a ridge of each pair of the chamfer surfaces and an intersection of each chamfer surface and each tooth flank of the inner spline teeth are rounded off by plastic deformation.

Figure 1A:
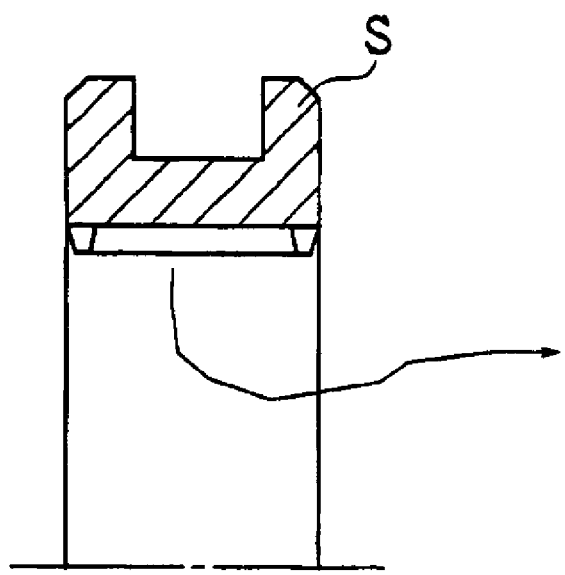
FIG. 1(A) is a sectional view of a synchronizer sleeve adapted for use in a gear transmission.
Figure 1B:
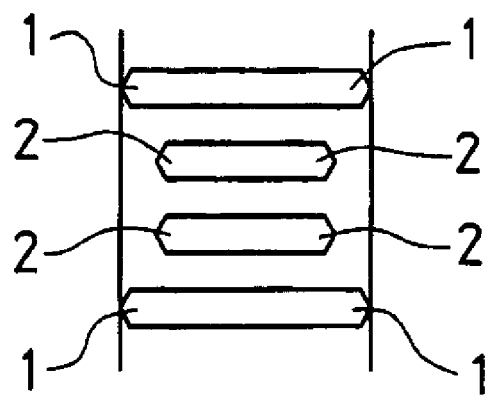
FIG. 1(B) is an illustration of arrangement of inner spline teeth for meshing engagement and for synchronization shown in FIG. 1(A)
Figure 2A:
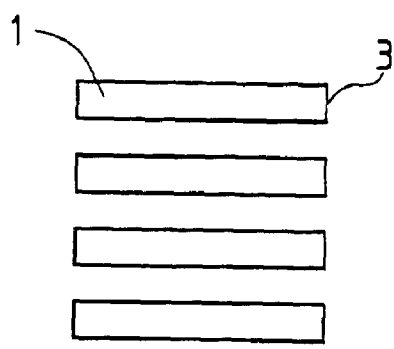
FIGS. 2(A)–2(E) illustrates a conventional cutting process of forming a chamfer surface on the inner spline teeth of the synchronizer sleeve shown in FIG. 1(A)
Figure 2B:
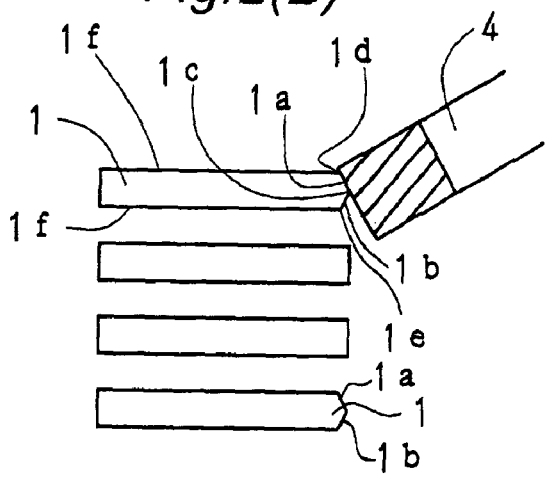
Figure 2C:
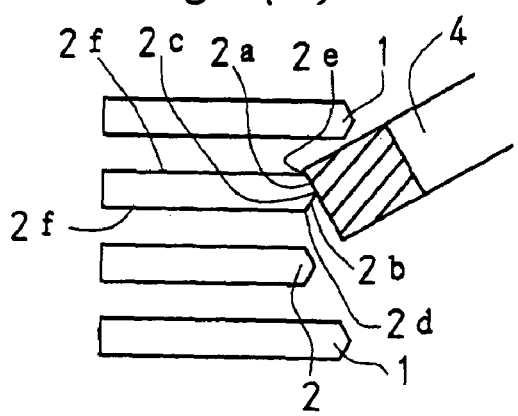
Figure 2D:
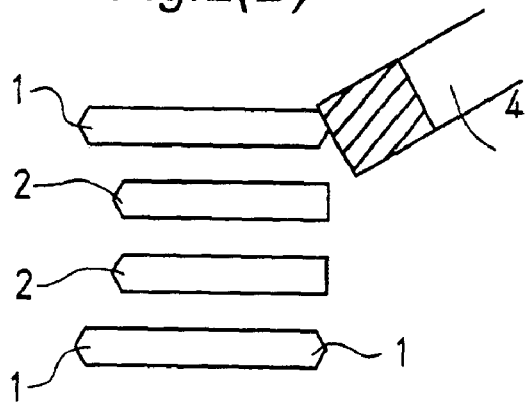
Figure 2E:
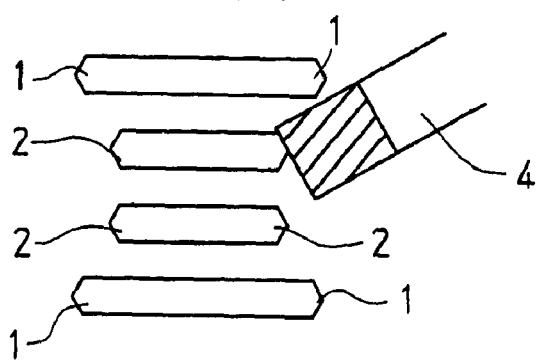
Figure 3A:
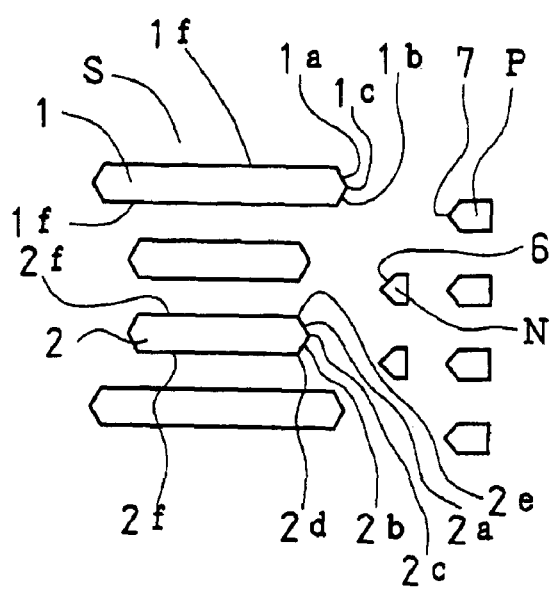
FIGS. 3(A)–3D) illustrates an engagement condition of the synchronizer sleeve shown in FIG. 1(A) with a synchronizer ring and a piece gear in shifting operation.
Figure 3B:
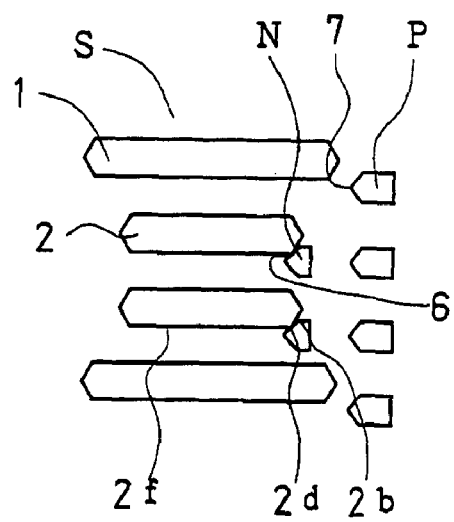
Figure 3C:
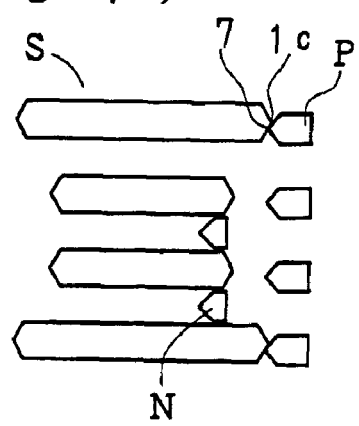
Figure 3D:
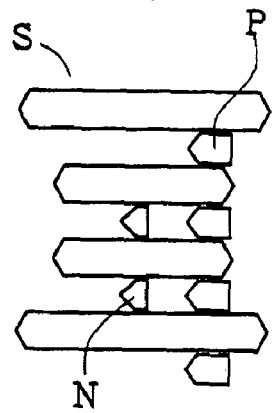
Figure 4A:
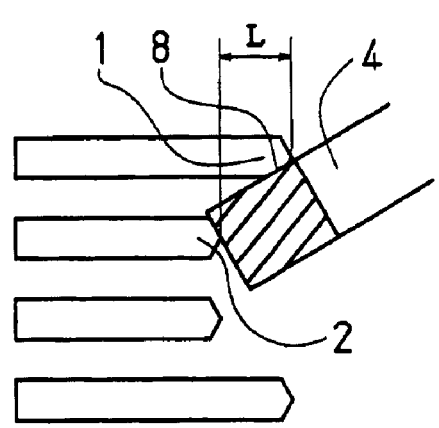
FIGS. 4(A)–4(B) illustrates a cutting process of forming chamfers for meshing engagement and for synchronization on inner spline teeth of a conventional synchronizer sleeve.
Figure 4B:
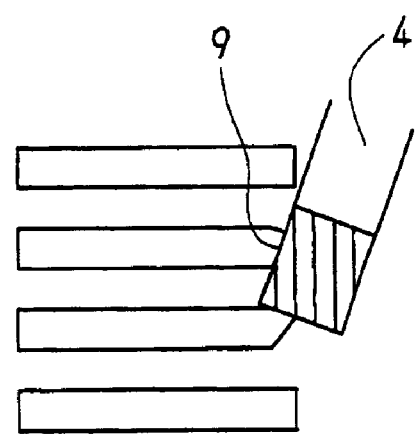
Figure 11:
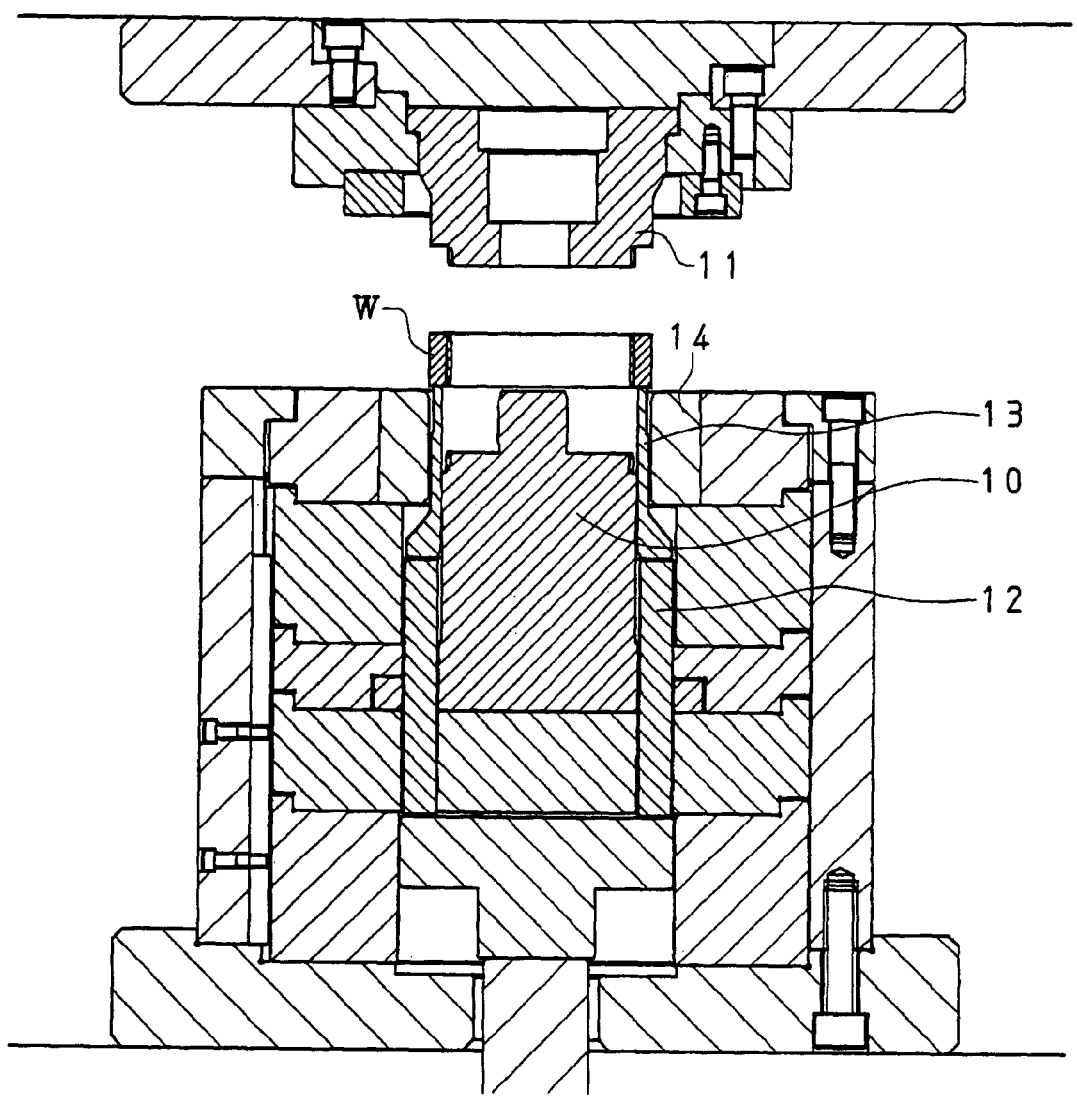
FIG. 11 is a vertical sectional view illustrating an operated condition of the press-forming apparatus shown in FIG. 5.

Thus, the inner spline teeth W2 of work piece W are formed shorter in axial length than the inner spline teeth W1 by plastic deformation under pressure and formed by press in the form of spline teeth 2 for synchronization shown in FIGS. 1(A), 1(B). In addition, the downward movement amount of the upper die 11 relative to the lower die 10 can be defined by abutment of the stopper 20 against the inner dice 14 and outer dice 15. When the ram of the press-machine is lifted after finish of the pressure process, the upper die 11 is moved upward, and the work piece W is raised by upward movement of the knockout pins 12 as shown in FIG. 11 and removed from the lower die 10 and inner dice 14.

What is claimed is:

1. A press-forming apparatus for a synchronizer sleeve formed at its inner periphery with first inner spline teeth for meshing engagement to be meshed with a clutch of a change-speed gear train and second spline teeth for synchronization shorter in axial direction than the first spline teeth and positioned among them in a circumferential direction to be meshed with a synchronizer ring, comprising:
    a pair of upper and lower dies, either one of the dies having first and second outer spline teeth formed to be coupled with the first and second inner spline teeth of said synchronizer sleeve, the first outer spline teeth of said die being formed at their one ends with a first chamfer forming portion respectively for forming a pair of chamfers on each distal end of the first inner spline teeth of said synchronizer sleeve, and the second outer spline teeth of said die being formed respectively at their one ends with a second chamfer forming portion smaller in depth than the first chamfer forming portion for forming a pair of chamfers on each distal end of the second inner spline teeth of said synchronizer sleeve, wherein a small diameter portion of the second chamfer forming portion is formed smaller than a small diameter portion of the first chamfer forming portion;
    wherein the synchronizer sleeve is pressed in a condition where the first and second inner spline teeth of said synchronizer sleeve have been vertically coupled at their one ends with the first and second outer spline teeth of said die thereby to form a pair of chamfer surfaces on the distal ends of the first and second inner spline teeth of said synchronizer sleeve respectively and to form the second inner spline teeth of said synchronizer sleeve shorter in axial length than the first inner spline teeth of said synchronizer sleeve.

2. A press-forming apparatus for a synchronizer sleeve as recited in claim 1, wherein the first and second chamfer forming portions of said die are formed at their proximal ends with a pair of chamfer forming surfaces in a condition where a ridge of the chamfer forming surfaces and an intersection of each of the chamfer forming surfaces and each tooth flank of the outer spline teeth are rounded off.

3. A press-forming apparatus for a synchronizer sleeve formed at its inner periphery with first inner spline teeth for meshing engagement to be meshed with a clutch gear of a change-speed gear train and second inner spline teeth for synchronization shorter in axial direction than the first inner spline teeth and positioned among them in a circumferential direction to be meshed with a synchronizer ring, comprising:
    an upper die having first and second outer spline teeth formed to be coupled with the first and second inner spline teeth of said synchronizer sleeve, the first outer spline teeth of said upper die being formed at their upper ends with a first chamfer forming portion for forming a pair of chamfers on each distal end of the first inner spline teeth of said synchronizer sleeve respectively, and the second outer spline teeth of said upper die being formed at their upper ends with a second chamfer forming portion smaller in depth than the first chamfer forming portion for forming a pair of chamfers on each distal end of the second inner spline teeth of said synchronizer sleeve respectively, wherein a small diameter portion of the second chamfer forming portion is formed smaller than a small diameter portion of the first chamfer forming portion;
    a lower die having first and second outer spline teeth formed to be coupled with the first and second inner spline teeth of said synchronizer sleeve, the first outer spline teeth of said lower die being formed at their lower ends with a first chamfer forming portion for forming a pair of chamfers on the other distal ends of the first inner spline teeth of said synchronizer sleeve respectively, and the second outer spline teeth of said lower die being formed at their lower ends with a second chamfer forming portion smaller in depth than the first chamfer forming portion for forming a pair of chamfers on the other distal ends of the second inner spline teeth of said synchronizer sleeve respectively, wherein a small diameter portion of the second chamfer forming portion is smaller than a small diameter portion of the first chamfer forming portion;
    wherein the synchronizer sleeve is pressed in a condition where the first and second inner spline teeth of said synchronizer sleeve have been vertically coupled at their one ends with the first and second outer spline teeth of said lower die and at their other ends with the first and second outer spline teeth of said upper die thereby to form a pair of chamfer surfaces on opposite ends of the first and second inner spline teeth of said synchronizer sleeve respectively and to form the second inner spline teeth of said synchronizer sleeve shorter in axial length than the first inner spline teeth of said synchronizer sleeve.

4. A press-forming apparatus for a synchronizer sleeve as recited in claim 3, wherein the lower die is formed thereon with a guide projection of polygonal cross-section, while the upper die is formed with an engagement bore to be coupled with the guide projection of the lower die for positioning the outer spline teeth of the upper die and the outer spline teeth of the lower die in phase with the upper die coupled with the lower die.

* * * * *